(No Model.)
F. W. HARDWICK.
VALVE FOR PNEUMATIC TIRES.
No. 501,715. Patented July 18, 1893.
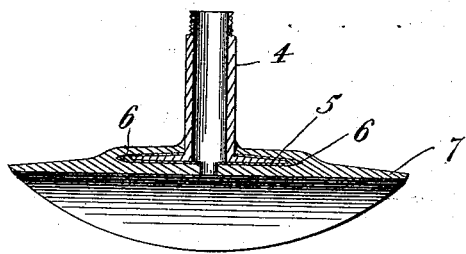
Fig. I.
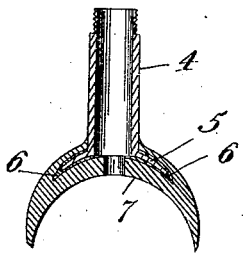
Fig. II.
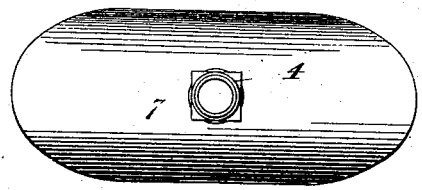
Fig. III.
Attest:
A. H. Erb
Perry Lewis
Inventor:
F. W. Hardwick
by Leonard Mauro,
his attorneys.

UNITED STATES PATENT OFFICE.

FREDERICK W. HARDWICK, OF PASSAIC, NEW JERSEY, ASSIGNOR TO THE NEW YORK BELTING AND PACKING COMPANY, LIMITED, OF ENGLAND.

VALVE FOR PNEUMATIC TIRES.

SPECIFICATION forming part of Letters Patent No. 501,715, dated July 18, 1893.

Application filed April 17, 1893. Serial No. 470,729. (No model.)

*To all whom it may concern:*

Be it known that I, FREDERICK W. HARDWICK, of the city of Passaic, county of Passaic, and State of New Jersey, have invented a new and useful Improvement in Valves for Pneumatic Tires, which is fully set forth in the following specification.

My invention relates to an improvement in valves intended for use on pneumatic tires, which are adapted for use on bicycles, buggies, sulkies and other vehicles.

Valves which are often designated as spoon valves, are now in use to a certain extent, on pneumatic tires. The spoon valve is so called, by reason of the shape of its base. The base of this valve is composed of a disk of brass or other suitable metal, which is bent over and curved on either side, at right angles to the line of the tire, so that the disk is concave on its under side, and thereby conforms to the contour of the tire, and fits closely thereto. This form of valve is generally used in tires which have an inflation tube separable from the outer tube or cover. The base is cleansed by muriatic acid, or in any other suitable way, and is placed between different layers of the inflation tube, and the inflation tube is thereafter vulcanized with the base between two layers thereof. This species of valve can also be used in tires differently formed from those described. There are objections to the valve thus described. The tire is apt to creep along the rim, which tends to tear the inflation tube, or cause it to leak. This often ruins the inflation tube, which is an expensive portion of the tire. Defects in manufacture are also liable to occur, which injure and often ruin the inflation tube. A minute leak in the inflation tube fatally impairs its efficiency. My invention is designed to obviate these difficulties.

I use a valve, having a base concave in cross-section, as hereinbefore described. I surround this base with a thin layer of hard rubber or vulcanite. Before so doing, I preferably dip the base in muriatic acid, or roughen the metal with a coarse file, whereby a more perfect adhesion is secured. Around this a layer of soft rubber is placed, which should preferably extend in every direction a considerable distance beyond the circumference of the metallic base, and beyond the layer of hard rubber thereon; it should also preferably extend considerably farther in the direction of the length of the tire, to which it is to be adjusted, than toward the sides. The whole is then vulcanized so as to form, as it were, substantially one piece. The under side of the valve will then present throughout its entire length and width a surface of soft rubber to the inflation tube, to which it can readily be cemented. The object of extending the soft rubber beyond the metallic part in every direction is because the soft rubber makes a more perfect joint where it is flexible, and it is obvious that this more perfect joint should extend around the entire circumference of the valve. The lengthening of the soft rubber in the direction of the circumferential line of the tire tends to give it additional stability.

In case the tire creeps, there is little likelihood of injury to the inflation tube. If the base of the valve becomes loose, it can be again cemented to the inflation tube. Any injury, which is likely to occur, is to the base of the valve, and this is of comparatively trifling value. Defects in manufacture, in like manner, will generally not injure the inflation tube, but merely the base of the valve.

I have described the mode of manufacture that I prefer. Numerous variations can be made without departing from my invention. The layer of vulcanite or hard rubber is advantageous in that it unites closely with the metal base of the valve, but it can be entirely dispensed with, or in its place there can be substituted, a layer of soft rubber of a greater degree of hardness than the outer covering of soft rubber. Instead of the metal base referred to, the base may be of any other substance, which is rigid and strong and otherwise suitable.

The accompanying drawings will serve to illustrate my invention, in which—

Figure I is a longitudinal section, Fig. II a cross-section, and Fig. III a plan view of a valve constructed in accordance with the invention.

The metallic part of the valve consists of the tubular stem 4 and the spoon-shaped base 5. The base 5 is surrounded preferably by a thin layer 6 of hard rubber, and the whole is inclosed or embedded in the layer 7 of soft rubber, which projects beyond the metallic base in every direction, and is prolonged in the direction of the circumferential line of the tire.

What I claim, and desire to secure by Letters Patent, is—

1. A valve for pneumatic tires, designed for use on bicycles, buggies, sulkies, and the like, having a base of metal, or other suitable material, concave in cross-section, covered by a layer of vulcanite or hard rubber, and a layer of soft rubber, substantially as described.

2. A valve for pneumatic tires, designed for use on bicycles, buggies, sulkies, and the like, having a base of metal, or other suitable material, concave in cross-section, covered by a layer of soft rubber, substantially as described.

3. A valve for pneumatic tires, designed for use on bicycles, buggies, sulkies, and the like, having a base of metal, or other suitable material, concave in cross-section, covered by a layer of soft rubber, which extends a considerable distance beyond the metallic base around its entire circumference, substantially as described.

4. A valve for pneumatic tires, designed for use on bicycles, buggies, sulkies, and the like, having a base concave in cross-section; that part of the base which is adjacent to the circumference, being flexible, and the parts adjacent to and surrounding the center of the base, being rigid, substantially as described.

In testimony whereof I have signed this specification in the presence of two subscribing witnesses.

FRED. W. HARDWICK.

Witnesses:
SCHUYLER FINCH,
W. W. SCOTT.

It is hereby certified that the assignee "The New York Belting and Packing Company Limited," in Letters Patent No. 501,715, granted July 18, 1893, upon the application of Frederick W. Hardwick, of Passaic, New Jersey, for an improvement in "Valves for Pneumatic Tires," should have been described and specified as *The New York Belting and Packing Company, Limited, of Great Britain*, instead of "The New York Belting and Packing Company, of England"; and that the said Letters Patent should be read with this correction therein that the same may conform to the record of the case in the Patent Office.

Signed, countersigned, and sealed this 22d day of August, A. D. 1893.

[SEAL]

JNO. M. REYNOLDS,
*Assistant Secretary of the Interior.*

Countersigned:
    S. T. FISHER,
        *Acting Commissioner of Patents.*